Sept. 27, 1966  LE ROY W. FREEBY ET AL  3,275,035
PLURAL SEQUENTIALLY OPERATED SNAP ACTION VALVES
Filed Nov. 20, 1962  6 Sheets-Sheet 1

INVENTORS
LE ROY W. FREEBY
BY WILBUR F. JACKSON

THEIR ATTORNEYS

INVENTORS
LE ROY W. FREEBY
WILBUR F. JACKSON
BY

THEIR ATTORNEYS

Sept. 27, 1966 LE ROY W. FREEBY ET AL 3,275,035
PLURAL SEQUENTIALLY OPERATED SNAP ACTION VALVES
Filed Nov. 20, 1962 6 Sheets-Sheet 3

INVENTORS
LE ROY W. FREEBY
WILBUR F. JACKSON
BY
Caudr & Caudr
THEIR ATTORNEYS

INVENTORS
LE ROY W. FREEBY
WILBUR F. JACKSON
BY

*Cauder & Cauder*

THEIR ATTORNEYS

Sept. 27, 1966   LE ROY W. FREEBY ET AL   3,275,035
PLURAL SEQUENTIALLY OPERATED SNAP ACTION VALVES
Filed Nov. 20, 1962   6 Sheets-Sheet 5

INVENTORS
LE ROY W. FREEBY
BY WILBUR F. JACKSON

THEIR ATTORNEYS

Sept. 27, 1966    LE ROY W. FREEBY ET AL    3,275,035
PLURAL SEQUENTIALLY OPERATED SNAP ACTION VALVES
Filed Nov. 20, 1962                                    6 Sheets-Sheet 6
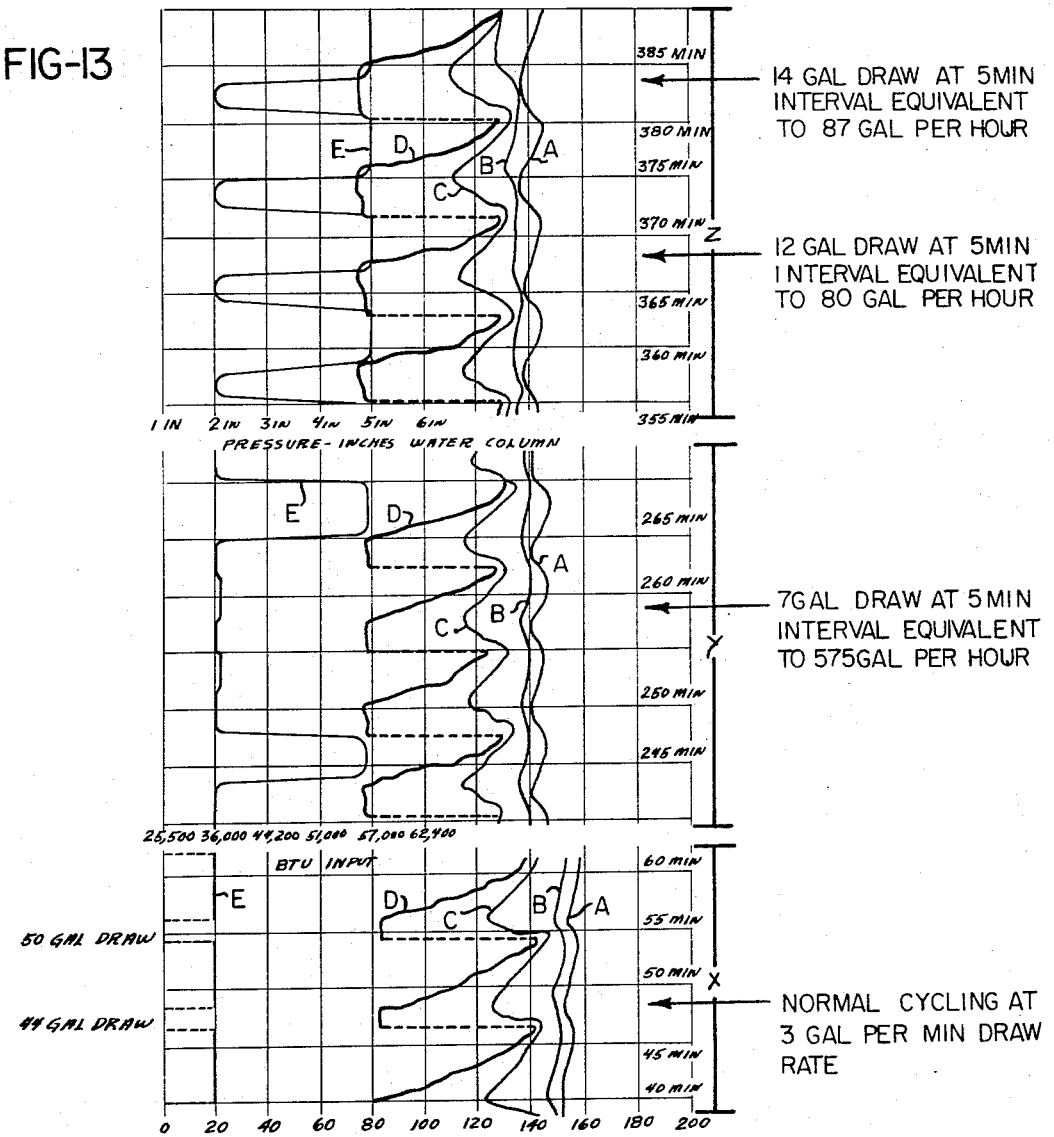
A. TEMPERATURE OF OUTLET WATER
B. TEMPERATURE OF WATER 14" DOWN IN TANK
C. TEMPERATURE OF WATER AT 41" DOWN IN TANK (THERMOSTAT LEVEL)
D. TEMPERATURE OF INLET WATER
E. GAS INPUT INCHES W C AND BTU RATE
INVENTORS
LE ROY W. FREEBY
WILBUR F. JACKSON
BY
*Cauda & Cauda*
THEIR ATTORNEYS

United States Patent Office 3,275,035
Patented Sept. 27, 1966

3,275,035
PLURAL SEQUENTIALLY OPERATED
SNAP ACTION VALVES
Le Roy W. Freeby, Huntington Beach, and Wilbur F. Jackson, Rolling Hills, Calif., assignors to Robertshaw Controls Company, Richmond, Va., a corporation of Delaware
Filed Nov. 20, 1962, Ser. No. 238,899
6 Claims. (Cl. 137—630.14)

This invention relates to an improved control device for water heaters and the like, as well as to improved parts for such a control device or the like.

Heretofore, various control devices have been provided for domestic water tanks and the like to control the heating thereof.

For example, one prior known control device included a housing having means to receive fuel, such as gas or the like, from a source thereof and having means to selectively direct the fuel to a pilot burner and a main burner, the pilot burner having a continuously burning flame for igniting fuel issuing from the main burner in an intermittent operation thereof and the main burner being utilized to heat the water in the tank to tend to maintain the water at a constant temperature regardless of the amount of heated water drawn from the tank.

Such a control device has a thermostatically operated valve means interconnecting the source of fuel with the main burner whereby the thermostat means senses the temperature of the water in the tank and opens the valve means when the temperature of the water falls below a selected temperature setting to cause the main burner to heat the water tank up to the selected temperature whereby the thermostat means closes the valve means to terminate the operation of the main burner.

However, it has been found that in such a prior known control, the recovery rate of the temperature in the water heater tank remains the same whether small draws of hot water or large draws of hot water are made on the water heater tank whereby the control must be set at a recovery rate sufficient to supply hot water in a reasonable time after a large draw of hot water has been made.

In this manner, the control also supplies the same high recovery rate when small draws of hot water are made whereby not only does the temperature of the water in the water heater tank overshoot the selected temperature to provide a dangerous hot water condition for house use but also the larger burner flame required for the high recovery rate reduces the life of the water heater tank.

In order to overcome this problem of prior known water heater controls, one would have to use a larger capacity water heater tank whereby not only is the same uneconomical to operate during normal operation thereof but also the same requires more building space adding to the overall cost of such an installation.

However, the improved control device of this invention permits a normal amount of fuel to issue from the main burner when the temperature of the water in the water tank only falls below a selected temperature a predetermined amount during normal draws of hot water whereby a normal, relatively low recovery rate is utilized.

However, should the temperature of the water fall below the predetermined amount by having an excessive or abnormal draw thereon, the control device of this invention automatically effects a greater flow of fuel to the main burner to rapidly heat up the water in the tank at a relatively high recovery rate until the temperature of the water approaches the selected temperature whereby the control device reduces the amount of fuel issuing from the burner to a normal amount of fuel which will be effective to subsequently bring the temperature of the water in the tank to the selected temperature.

In this manner, not only is overshooting of the temperature of the water tank substantially eliminated or materially reduced over prior known control devices by the control device of this invention, but also the control device of this invention permits a relatively smaller water tank to be utilized in situations where excessive draws may be effected thereon because such successive draws are compensated by the control device of this invention while still operating the main burner in a normal manner should normal draws be made on the water tank.

In this manner, prolonged tank life is effected by the control device of this invention because reduced recovery rates are utilized during periods of lesser demands on the hot water system and because temperature overshoot is eliminated by reducing the recovery rate prior to cycle shutoff.

Therefore, it can be seen that the control device of this invention is adapted to permit a small sized water tank to be utilized in applications wherein emergency excessive draws therefrom can readily be compensated for by the control device of this invention so that oversized water tank constructions need not be utilized in order to anticipate such emergency excessive draws.

Accordingly, it is an object of this invention to provide improved water heating system or the like.

Another object of this invention is to provide an improved control device for such a system or the like.

A further object of this invention is to provide an improved valve means for such a control device or the like.

Other objects, uses and advantages of this invention are apparent from a reading of this description which proceeds with reference to the accompanying drawings forming a part thereof and wherein:

FIGURE 13 is a graph illustrating the typical operation of the control device of FIGURE 3.

Figure 1:
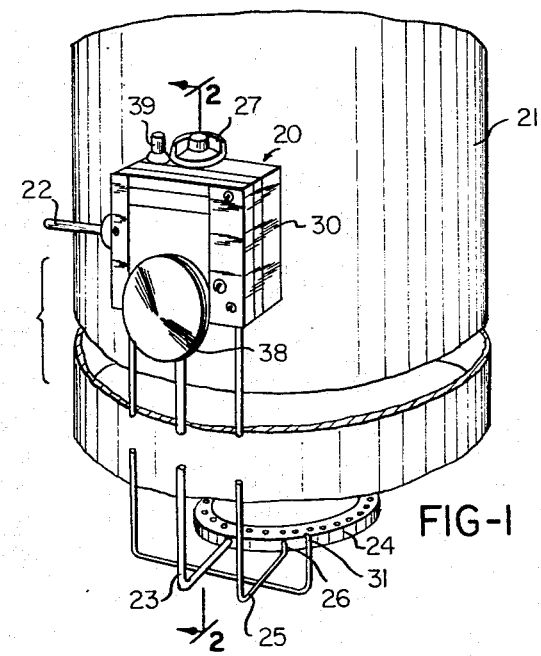
FIGURE 1 is a fragmentary, schematic, perspective view illustrating one embodiment of the water tank heating system of this invention.

While the various features of this invention are hereinafter described and illustrated as being particularly adaptable for forming a control device for a domestic water tank or the like, it is to be understood that the various features of this invention can be utilized singly or in any combination thereof to provide other constructions as desired.

Therefore, this invention is not to be limited to only the embodiments illustrated in the drawings, because the drawings are merely utilized to illustrate one of the wide variety of uses of this invention.

Figure 2:
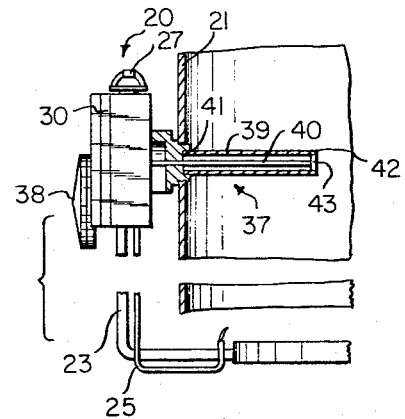
FIGURE 2 is a fragmentary, cross-sectional view of the system illustrated in FIGURE 1 and is taken on line 2—2 thereof.

Referring now to FIGURES 1 and 2, the improved control device of this invention is generally indicated by the reference numeral 20 and is adapted to maintain the temperature of water contained in a tank 21, such as a conventional domestic water heater tank or the like, at a selected temperature regardless of the amount of hot water drawn therefrom, the water level in the tank 21 being maintained at a substantially constant level by conventional means (not shown) as hot water is drawn from the tank 21.

In particular, the control device 20 is interconnected to a source of fuel by an inlet conduit 22 and is adapted to interconnect the inlet conduit 22 to an outlet conduit 23 leading to a main burner 24 for heating the tank 21. The control device 20 is also adapted to interconnect the inlet conduit 22 to a conduit 25 leading to a pilot burner 26 utilized to ignite fuel issuing from the main burner 24 in a manner hereinafter described.

The general operation of the control device 20 will now be described and reference is made to FIGURES 1, 2 and 3.

When the water heater system of this invention is initially installed, the control knob 27 of the control device 20 is normally disposed in an "off" position thereof whereby a cock valve 29, disposed in the housing 30 of the control device 20 is disposed in such a position that communication between the inlet 22 and the conduits 23 and 25 is prevented.

However, a conventional safety valve is disposed upstream from the cock valve 29 whereby the safety valve must be opened before the cock valve 29 can interconnect fuel to either the pilot burner 26 or main burner 24.

To actuate the water heater system of this invention, the control knob 27 is first rotated to a "pilot" position thereof whereby a groove of the cock valve 29 is adapted to only interconnect the inlet 22 to the pilot burner 26.

With the control knob 27 disposed in the "pilot" position thereof, a button 39 is manually pressed downwardly to manually open the safety valve member upstream from the cock valve 29 whereby fuel can issue from the pilot burner 26 and can be ignited either manually or automatically, as desired.

When a flame appears at the pilot burner 26, the button 38 is manually held downwardly until the heat of the flame issuing at the pilot burner 26 is sufficient to cause a thermocouple 31 (FIGURE 1) to operate suitable mechanism to hold the safety valve open.

Thus, it can be seen that the safety valve member will always remain in the open position thereof as long as a flame appears at the pilot burner 26.

However, should the flame at the pilot burner 26 be terminated, suitable spring means returns the safety valve member to the closed position to prevent fuel from passing through the control device 20.

Figure 3:
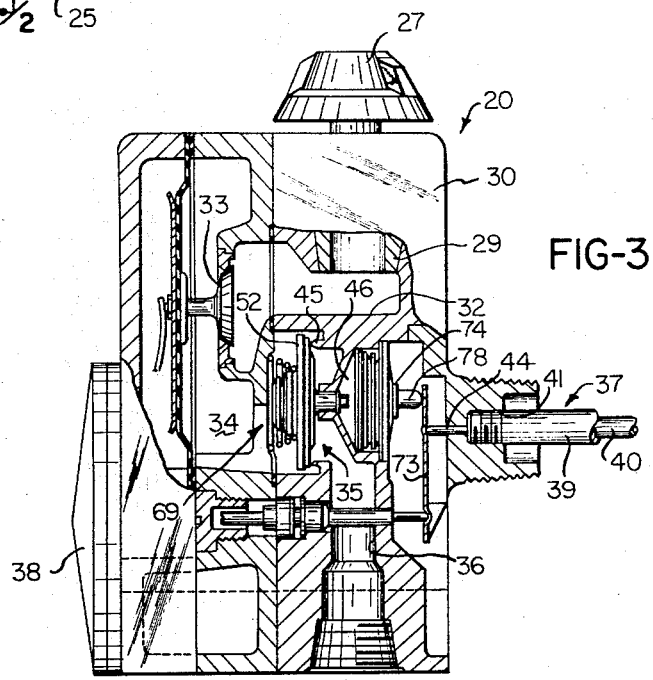
FIGURE 3 is an enlarged, fragmentary, axial, cross-sectional view of the control device of FIGURE 1.

After the pilot burner 26 has been ignited and the safety valve member is held in the open position, the control knob 27 is rotated to the "on" position thereof as illustrated in FIGURE 3 whereby the cock valve 29 not only continues to interconnect the inlet 22 with the pilot burner 26 but also interconnects the inlet 22 with a chamber 32 in the housing 30.

Fuel issuing from the chamber 32 can pass through a suitable pressure regulator 33 or not, as desired, such main fuel pressure regulating means not forming a part of this invention. After the fuel from the chamber 32 has passed through the pressure regulator 33, the same enters a chamber 34 formed in the housing 30 as illustrated in FIGURE 3.

From chamber 34, the gas or fuel is adapted to pass through a valve means 35 of this invention to an outlet chamber 36 interconnected to the outlet conduit 23 which leads to the main burner 24.

The fuel is only adapted to pass through the valve means 35 in a manner hereinafter described when a water temperature sensing means 37, FIGURES 2 and 3, determines that the temperature of the water in the tank has fallen below a temperature selected by a control knob 38 of the control device 20 a predetermined amount.

The temperature sensing or thermostat means 37 comprises a conventional tube 39 and rod 40 arrangement, the tube 39 and rod 40 being disposed in the interior of the tank 21 in such a manner that the end 41 of the tube 39 is fixed relative to the tank 21 and the other end 42 of the tube 39 is free for movement relative to tank 21.

The rod 40 has an end 43 secured to the free end 42 of the tube 39 and is formed of a material having a lower coefficient of thermal expansion than the tube 39 whereby the free end 44 of the rod 40 is moved to the left as illustrated in FIGURE 2 when there is a decrease in temperature in the tank 21 because the tube 39 contracts. Conversely, the end 44 of the rod 40 is moved to the right as illustrated in FIGURE 2 when the temperature in the tank 21 increases because the tube 39 expands.

In this manner, the thermostat means 37, after the pilot burner 26 has been ignited and the control knob 27 is disposed in the on position thereof, opens the valve means 35 in a manner thereinafter described to allow fuel to issue from the burner 24 when the temperature of the water in the tank 21 is below a selected temperature so that the burner 24 will heat the water in the tank 21 to the temperature selected by the conrol knob 38 in a manner conventional in the art.

When the temperature of the water in the tank 21 has reached the desired temperature level, the thermostat means 37 permits the valve means 35 to close so that no fuel issues from the burner 24 until the temperature of the water in the tank 21 falls below the selected temperature.

Thus, it can be seen that the main burner 24 is intermittently operated by the thermostat means 37 to maintain the water in the tank 21 at a selected temperature regardless of the amount of hot water drawn from the tank 21.

While one type of a general control system for heating a water tank has been described, it is to be understood that such a system is merely emblematic of the many different types of systems to which the following features of this invention can be utilized.

The particular details and operation of the valve means 37 of this invention will now be described and reference is made to FIGURES 4–7.

Figure 4:
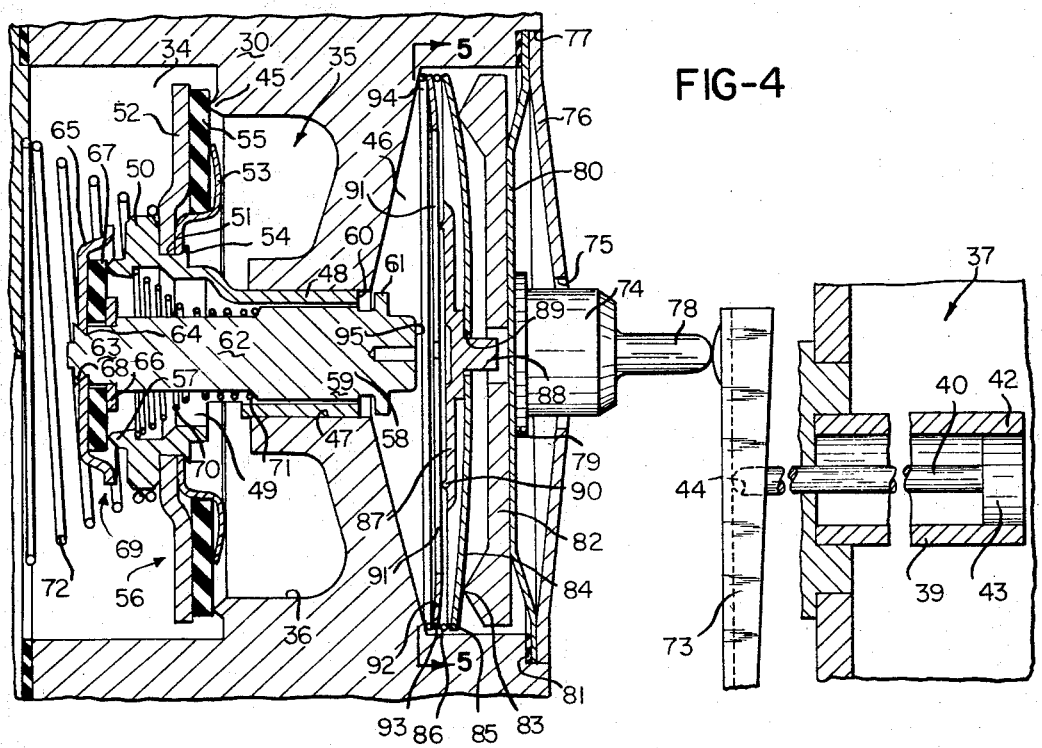
FIGURE 4 is an enlarged, schematic, cross-sectional view illustrating one embodiment of the valve means of the control device illustrated in FIGURE 3.
Figure 5:
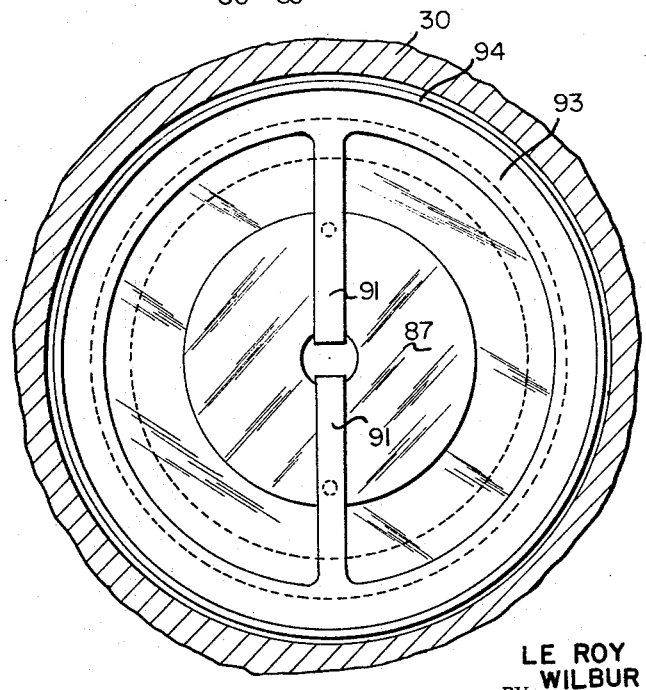
FIGURE 5 is an enlarged view of the motion amplifying means of the device illustrated in FIGURE 4 and is taken on line 5—5 thereof.

As illustrated in FIGURE 4, the inlet chamber 34 and outlet chamber 36 formed in the housing 30 are separated by an annular supplemental valve seat 45 formed on the housing 30, the housing 30 having an open ended cavity 46 formed therein and interconnected to the chamber 36 by a bore 47.

A hollow valve stem 48 is disposed in sealing and sliding relation in the bore 47 of the housing 30 and has a passage 49 formed therein which is adapted to interconnect the interior of the valve stem 48 to the chamber 36.

The valve stem 48 has an enlarged head 50 provided with an annular recess 51 receiving a backing disc 52 and a retainer disc 53 therein which are adapted to be secured thereto by staking at 54, the valve disc 52 and retainer disc 53 cooperating to secure an annular resilient face valve member 55 therebetween, the members 48, 52, 53 and 54 comprising a supplemental valve member 56 which is adapted to cooperate with the supplemental valve seat 45 in the manner illustrated in FIGURE 4 to close the supplemental valve seat 45.

The enlarged head 50 of the valve stem 48 defines a main valve seat 57 adapted to interconnect the chamber 34 with the interior of the valve stem 48.

Another valve stem 58 has an enlarged end portion 59 disposed in sliding and sealing engagement with the interior peripheral surface of the valve stem 48, the enlarged end 59 of the valve stem 58 projecting beyond the end surface 60 of the valve stem 48 and having an outwardly directed annular shoulder 61 adapted to abut the end 60 of the valve stem 48 in a manner hereinafter described.

The valve stem 58 has a reduced portion 62 disposed in the valve stem 48 to permit communication between the main valve seat 57 and the passage 49 in the valve stem 48 for a purpose hereinafter described.

The valve stem 58 is provided with a head 63 having an annular recess 64 respectively receiving a backing valve disc 65, a retainer 66 and a resilient face valve disc 67 therebetween, the members 65–67 being staked in the recess 64 at 68 whereby the members 58 and 65–67 define a main valve member 69 which cooperates with the main valve seat 57.

A compression spring 70 is disposed between an inwardly directed annular shoulder 71 formed on the valve stem 58 and the enlarged end 50 of the valve stem 48 to tend to hold the main valve member 69 against the main valve seat 57 to close the same.

When the main valve member 69 is seated, the annular shoulder 61 of the valve stem 58 is disposed remote from the end 60 of the valve stem 48 whereby the main valve member 69 can be moved to the left to open the main valve seat 57 before the shoulder 61 of the valve stem 58 contacts the end 60 or the valve stem 48 for a purpose hereinafter described.

A compression spring 72 is disposed between the housing 30 and the supplemental valve member 56 whereby the compression spring 72 tends to maintain the supplemental valve member 56 in its closed position against the supplemental valve seat 45, the force of the compression spring 72 being stronger than the force of the compression spring 70 for a purpose hereinafter described.

The thermostatic means 37 is utilized to operate the valve means 35 in a desired sequence, the end 44 of the rod 40 of the thermostatic means 37 engaging a lever 73 which is adjusted in a manner well known in the art to select a desired temperature setting of the water in the tank 21 by the control knob 38, such temperature selecting structure not forming a part of this invention.

Accordingly, it is sufficient to state that should it be desired to maintain the temperature of the water in the tank 21 at a selected temperature, the control knob 38 of the control device 20 is turned to that selected temperature to adjust the lever 73 so that the thermostat means 37 will operate the valve means 35 of this invention in a manner hereinafter described to maintain the temperature of the water in the tank 21 at the selected temperature.

The lever 73 is adapted to engage a button 74 projecting outwardly through an aperture 75 in a diaphragm retainer 76 disposed in an annular recess 77 of the housing 30.

The button 74 has an end 78 engageable by the lever 73 whereby a movement of the end 44 of the rod 40 of the thermostatic means 37 to the left moves the button 74 to the left upon a decrease in temperature of the water within the tank 21.

The button 74 has the other end 79 thereof disposed against a sealing disc 80 disposed in the recess 77 against a gasket 81.

A movable plunger 82 is disposed against the lefthand side of the sealing disc 80 and has an annular shoulder 83 adapted to be disposed against a snap-action disc or member 84 normally disposed in the bowed condition illustrated in FIGURE 4, the snap-action member 84 having the outer periphery 85 thereof held against a retainer ring 86.

A fulcrum member 87 has a central projection 88 passing through a central aperture 89 formed in the snap-action member 84 and is disposed on the lefthand side thereof, the fulcrum member 87 having an annular shoulder 90 disposed against opposed flexible legs 91 of a motion amplifying lever 92 having its outer periphery 93 held between the retainer ring 86 and another ring 94.

When the button 74 is moved from the position illustrated in FIGURE 4 to the left as illustrated in the drawings, the plunger 82 acts against the snap-action member 84 to move the same to its dead-center position. When the snap-action member 84 is moved beyond its dead-center position, the same snaps into the over-center bowed condition illustrated in FIGURE 6 whereby the snapped snap-action member 84 causes the fulcrum member 87 to push the lever legs 91 against the end 95 of the stem 58 of the main valve member 69 to move the main valve member 69 to the left in opposition to the force of compression spring 70 to open the main valve seat 57, the full travel of movement of the snapped snap-action member 84 only causing the shoulder 61 of the stem 58 to be disposed against or spaced from the end 60 of the stem 48 of the supplemental valve member 56 and not open the supplemental valve member 56 as illustrated in FIGURE 6.

Figure 6:
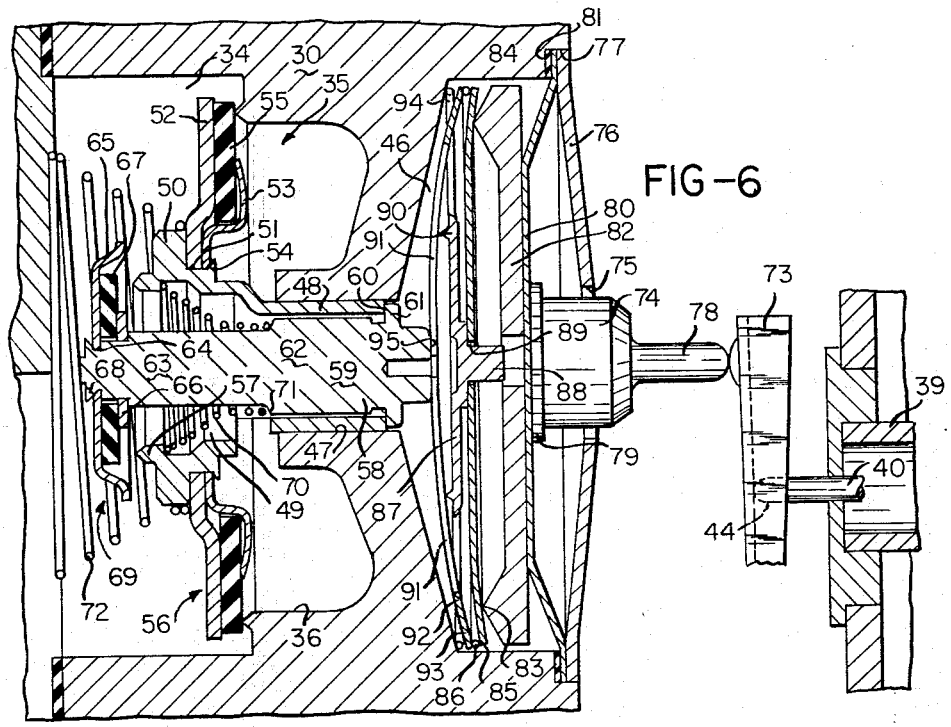
FIGURE 6 is a view similar to FIGURE 4 illustrating the valve means in one operating position thereof.

Further movement of the end 44 of the rod 40 of the thermostat means 37 to the left from the position illustrated in FIGURE 6 causes the button 74 to move to the left and through the members 82, 84, 87 and 91 causing the valve stem 58 to move to the left and carry the valve stem 48 therewith in opposition to the force of the compression spring 72 to open the supplemental valve member 56.

However, it has been found that when the legs 91 of the amplifying member 92 are relatively resilient rather than stiff, such further leftward movement of the button 74 does not initially open the supplemental valve member 56 but stores up motion in the flexing of the legs 91 because of the pressure of the gas in chamber 34 acting to hold the valve member 56 closed whereby the supplemental valve member 56 initially opens with a snap-action movement to provide a more rapid recovery rate than if the same were opened in a true modulating manner as will be apparent hereinafter.

As the end 44 of the rod 40 of thermostat means 37 begins to move to the right upon sensing an increase in the temperature of the water in the tank 21, the button 74 moves to the right causing the supplemental valve member 56 to close while the main valve member 69 remains in its open position. Subsequently, further movement of the button 74 to the right permits the main valve member 69 to close under the force of the compression spring 70 even though the lever legs 91 move out of engagement with the stem 58 of the main valve member 69.

The operation of the valve means 35 of this invention will now be described.

Assuming that the thermostat means 37 is so adjusted by the control knob 38 so that the system of this invention will tend to maintain the temperature of the water in the tank 21 at approximately 155° F., it has been found that by so designing the various members of the valve means 35, the snap-action member 84 will not be snapped over center to the position illustrated in FIGURE 6 until the temperature of the water has fallen approximately 15° F. from the selected temperature regardless of the selected temperature.

Thus, when the thermostatic means 37 senses that the water has fallen to approximately 140° F. in the above example, the snap-action means 84 is snapped over center to the position illustrated in FIGURE 6 to only open the main valve member 69 whereby fuel from the inlet chamber 34 can flow through the open main valve seat 57, passage 49 in the supplemental valve member 56, outlet passage means 36 and, thus, to the main burner 24 through the conduit 23, the fuel issuing from the main burner 24 being ignited by the pilot burner 26 to cause the burner 24 to heat the water in the tank 21 back to the selected temperature of 155° F.

The main valve member 69 and passage 49 are so constructed and arranged that when the main valve member 69 is opened in the manner illustrated in FIGURE 6, only a sufficient amount of fuel is delivered to the main burner 24 to heat the tank 21 under normal use of the water tank 21 when normal draws of hot water are being made.

For example, the opening of the main valve member 69 will cause an output of the main burner 24 of approximately 36,000 B.t.u.'s per hour with an orifice pressure of 2 inches w.c. during the heating of the tank 21 until the "off" temperature of 155° F. is reached whereby the main valve member 69 is closed by the button 74 moving back to the right to the position illustrated in FIGURE 4.

As the button 74 moves back to the right from the position illustrated in FIGURE 6 to the position illustrated in FIGURE 4, the main valve member 69 progressively moves closer to its valve seat 57 whereby the main valve member 69 throttles the flow of fuel to the main burner 24 so that as the water in the tank 21 heats up to the selected temperature, the amount of fuel issuing at the main burner 24 is decreased so that no overshooting thereof is effected.

If, however, a large hot water draw is made on the water tank 21, whereby means 37 senses a temperature below 140° F., the button 74 is further moved from the position illustrated in FIGURE 6 to the position illustrated in FIGURE 7 whereby the supplemental valve member 56 is opened because the end 61 of the main valve member 69 is engaging against the end 60 of the stem 48 of the supplemental valve member 56 to cause like movement thereof to the left as the button 74 is further moved to the left from the position illustrated in FIGURE 6.

For example, in one embodiment of this invention, the supplemental valve member 56 is opened to its maximum extent when the sensing means 37 senses a temperature of approximately 125° F. whereby a maximum recovery rate is provided by the burner 24 of approximately 60,000 B.t.u. per hour until the temperature of the water reaches 125° F.

Figure 7:
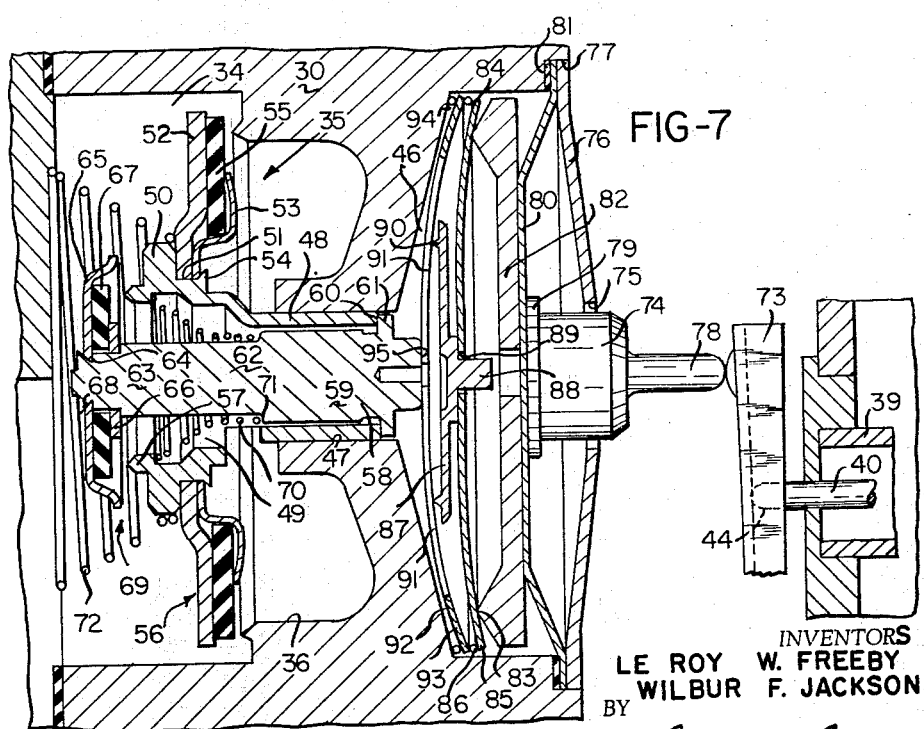
FIGURE 7 is a view similar to FIGURE 4 illustrating the valve means in another operating position thereof.

Thereafter, as the temperature of the water increases from 125° F. to approximately 145° F., the button 74 is progressively moved to the right from the position illustrated in FIGURE 7 to the position illustrated in FIGURE 6 to throttle the flow of fuel through the supplemental valve seat 45, the flow of fuel through the supplemental valve seat 45 progressively decreasing as the temperature of the water in the tank 21 approaches 145° F.

When the supplemental valve member 56 is finally returned to its closed position thereof, the main valve 69 remains in the open position thereof as illustrated in FIGURE 6 to supply a normal flow of fuel to the main burner 24 so that the water in the tank 21 is continued to be heated by the main burner 24 to the selected temperature of 155° F. by only the fuel flowing through the main valve seat 57.

In this manner, overshooting of the temperature of the water in the tank 21 is substantially eliminated by having the supplemental valve member 56 close as the temperature of the water approaches the selected temperature and only permitting the main valve member 69 to permit a reduced flow of fuel to the main burner 24 to bring the same up to the selected temperature.

A change in the dial setting of the control knob 38 merely moves the operating temperatures up or down on the thermostatic means 37 with the snap and throttling temperatures correspondingly changed. Therefore, the snap-throttle action is obtained at any temperature setting within the range of temperature adjustment of the control knob 38, the selected temperature of 155° F. set forth above merely being an example of one selected temperature.

In the embodiment of the valve means 35 illustrated in the drawings, the snap-action member 84 is so constructed and arranged that the same has a snap movement from the position illustrated in FIGURE 4 to the position illustrated in FIGURE 6 of approximately 0.040 of an inch. In this embodiment the lever 92 is initially disposed in the position illustrated in FIGURE 4 approximately 0.010 of an inch from the stem 58 of the main valve member 69 whereby the last 0.030 of an inch of movement of the snap-action member 84 from the position illustrated in FIGURE 4 to the position illustrated in FIGURE 6 is used to open the main valve member 69. The spacing between the shoulder 61 of the main valve member 69 and the end 60 of the stem 48 of the supplemental valve member 56 was set at approximately 0.030 of an inch so that the shoulder 61 is brought just into contact with the end 60 of the stem 48 of the supplemental valve member 56 when the snap-action member 130 is snapped over center to the position illustrated in FIGURE 6 so that the main valve member 69 only moves away from the valve seat 57 a distance of approximately 0.030 of an inch.

The supplemental valve member 56 only has to move approximately 0.020 of an inch away from the valve seat 45 to produce maximum flow of fuel to the main burner 24.

Therefore, it can be seen that an improved valving arrangement has been provided for the control device 20 of this invention whereby a normal amount of fuel is permitted to flow to the main burner 24 to heat the water in the tank 21 a relatively low recovery rate when normal draws of hot water are being made on the tank 21. However, should excessive draws of hot water be made on the water in the tank 21, the control device 20 increases the flow of fuel to the main burner thereof in such a manner that a relatively high recovery rate is provided, the high recovery rate not being necessary for normal operation of the tank 21.

In this manner, the water heater supplied for a domestic operation or the like need not be oversized for the normal operation thereof in order to provide for emergency operation thereof because the system of this invention permits a smaller size tank 21 to be utilized even though there may be times when excessive draws are made thereon.

Reference is now made to FIGURE 13 representing the operation of a control 20 of this invention utilized with a standard model 30 gallon gas water heater wherein the control was set and burner orificed to obtain a maximum input at the burner means 24 of 60,000 B.t.u.'s per hour at 5.5 inches w.c. when both the main valve member 69 and supplemental valve member 56 are disposed in the opened position and to obtain a flow of only 36,000 B.t.u.'s per hour at 2 inches w.c. when only the main valve member 69 is disposed in the open position.

The line A on the graph of FIGURE 13 represents the temperature of the outlet water, line B represents the temperature of water 14 inches down in the water heater tank 21, line C represents the temperature of water at approximately 41 inches down in the tank at a level of the thermostatic means 37, line D represents the temperature of the inlet water and line E represents the gas input in inches w.c. and B.t.u. rate.

The initial heating conditions resulted in a maximum input of 60,000 B.t.u.'s per hour at 5.5 inches orifice pressure because both the main valve member 69 and the supplemental valve member 56 were disposed in the open position until a water temperature of approximately 120° F. was reached when the control 20 closed the supplemental valve member 56 to drop the input to 36,000 B.t.u.'s per hour at 2 inches w.c.

The control cycled off when water at the thermostat level (indicated by the line C) obtained a temperature of 144° F. at the thermostat setting. The water was heated from 80° F. to 144° F. in a period of approximately 22.5 minutes, the equivalent to the recovery rate of 40 plus gallons per hour.

The water heater was cycled in the period between 22.5 minutes and 80 minutes with draws at a 3 gallon per minute rate just sufficient to cycle the control. Cycling on appears during this period with the input at the step flow of 36,000 B.t.u.'s per hour because only the main valve member 69 is moved to the opened position. Hot water outlet temperature was maintained during this period consisting of 7 cycles in the range between 144° F. and 160° F., as indicated by line A on chart section X.

During the period between 85 minutes and 105 minutes, draws were made at a 3 gallon per minute rate for 1 minute separated by a 5 minute interval. Five such draws were made. These draws are equivalent to 30 gallons per hour. The control cycled twice during this period from off to a minimum input of 36,000 B.t.u.'s per hour as only the main valve member 69 opened maintaining water outlet temperatures between 154° F. and 162° F.

During the period between 105 minutes and 145 minutes draws of 4 gallons at a 3 gallon per minute rate separated by 5 minute intervals were made. The heater cycled from off to minimum input of 36,000 B.t.u.'s per hour at 2 inches w.c. orifice pressure twice during this period maintaining outlet water temperature between 155° F. and 162° F.

Between 145 minutes and 225 minutes, similar intermittent draws of greater amounts of water, 5 gallons per draw and 6 gallons per draw, resulted in keeping the heater on continuously at minimum input of 36,000 B.t.u.'s per hour because only the main valve member 69 was opened. This shows the increased demand for hot water. Outlet water temperatures varied between 150° F. and 160° F. during this period.

During the next period (shown in the chart section Y) between 225 minutes and 275 minutes demand was again increased by drawing 7 gallons per draw at 5 minute intervals.

This further increased demand showed the first demand augmentation response of the control where input was increased twice from the minimum input of 36,000 B.t.u.'s per hour of the opening of the main valve member 69 to an augmented input of approximately 56,000 B.t.u.'s per hour at 4.9 inches w.c. pressure as the supplemental valve member 56 was also opened. These augmented inputs are indicated by the crest of the pressure curve at 245 minutes and 265 minutes.

As is shown in line E, the opening of the supplemental valve member 56 from fully closed to fully opened position was accomplished because the legs 91 of the amplifying member 92 are fairly resilient to cause a snap opening of the supplemental valve 56 as previously described to provide a more rapid recovery rate than would be provided if the supplemental valve member 56 was merely a true modulating valve member. Thus, the control 20 operates at a maximum capacity almost instantaneously when a demand is made thereon and thereby recovers the water heater at a rate faster than a modulating control.

This augmented input acted to maintain outlet water temperatures between 140° F. and 152° F. during this period of further increased demand equivalent to 57.5 gallons per hour.

During the period between 325 minutes and the end of the test at 385 minutes, successively higher demands were made with the equivalent draw rates from 62.5 gallons per hour up to 87 gallons per hour. The control responded by more frequent openings of the supplemental valve member 56 up to 57,000 B.t.u.'s per hour to maintain outlet water temperatures at 135° F. and 148° F. during this period of successively increased demand, as shown in chart section Z.

As can be seen from the chart of FIGURE 13, the control responded immediately to increased hot water demand by increasing the inputs. This compensates for the increased demand for hot water.

During period of relatively low demand as shown in the first half of the chart, only the minimum input is utilized to provide the necessary recovery rate. This tends to provide economy of operation both from the standpoint of heat loss and prolonged tank life.

While the example of a fuel flow rate of approximately 36,000 B.t.u.'s hour was given upon the opening of the main valve member 69, because of the size of the passage 49 in the stem 48 of the supplemental valve member 56, it is to be understood that the amount of flow of fuel controlled by the main valve member 69 can be varied by merely varying the size of the passage 49.

Further, other means could be provided for selectively adjusting the amount of fuel which will flow through the open main valve member 69 of the valve means 35 of this invention.

Figure 8:
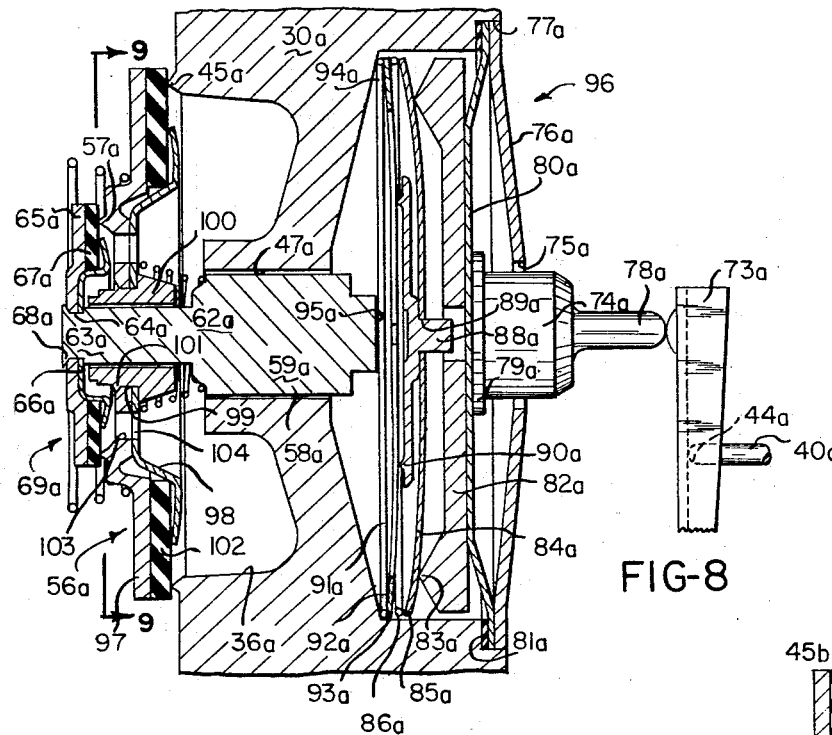
FIGURE 8 is a view similar to FIGURE 4 illustrating another embodiment of the valve means of this invention.

In particular, reference is made to FIGURE 8 wherein another valve means of this invention is generally indicated by the reference numeral 96 and parts thereof similar to the valve means 35 of FIGURE 4 are indicated by like reference numerals followed by the reference letter *a*.

Figure 9:
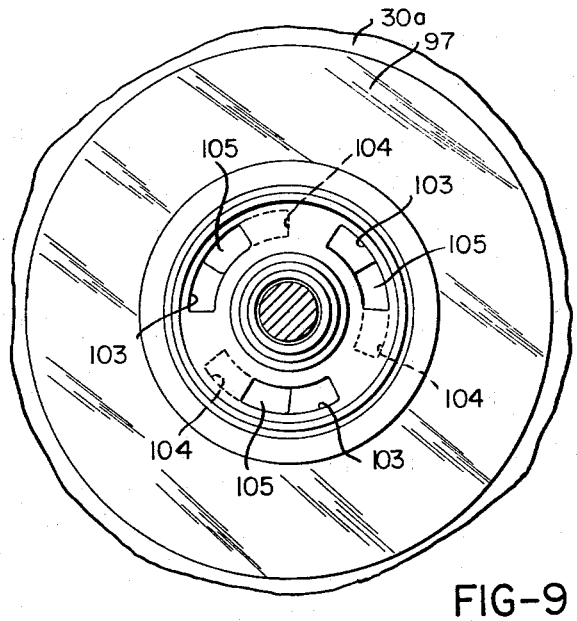
FIGURE 9 is an end view taken on line 9—9 of FIGURE 8.

As illustrated in FIGURES 8 and 9, the supplemental valve member 56a includes a valve backing member 97 and a retainer 98 secured in a recess 99 of a valve stem 100 by staking at 101, the retainer 98 and backing member 97 holding a resilient valve face member 102 therebetween which cooperates with the supplemental seat 45a in the manner previously described.

The backing member 97 of the supplemental member 56a is provided with a plurality of circumferentially disposed angular slots 103 passing therethrough inboard of the main valve seat 57a. Similarly, the retainer 98 of the supplemental valve member 56a is provided with a plurality of circumferentially disposed arcuate slots 104 which are adapted to register with slots 103 in the backing member 97 in the manner illustrated in FIGURE 9 to provide flow passages 105 interconnecting the main valve seat 57a with the outlet chamber 36a.

Thus, it can be seen that by merely adjusting the members 97 and 98 relative to each other prior to the staking at 101, the desired degree or passage size between the main valve seat 57a and the outlet passage 36a can be selected to provide a desired flow of fuel to the main burner 24 when the main valve member 69a is disposed in the fully opened position thereof.

Figure 10:
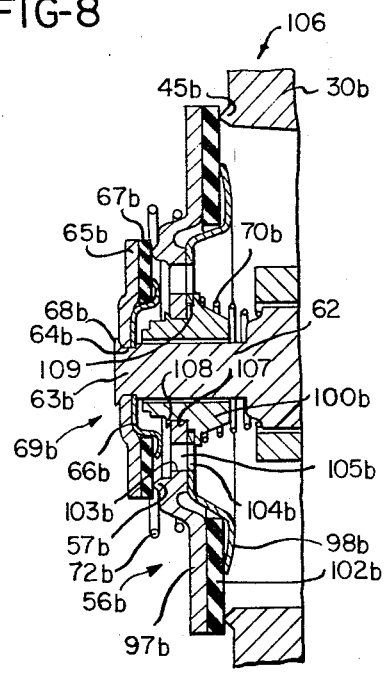
FIGURE 10 is a fragmentary view similar to FIGURE 8 and illustrates still another embodiment of the valve means of this invention.

While the valve means 96 illustrated in FGURE 8 merely discloses an initial setting adjustment for the passage size 105 before the staking 101, another valve means of this invention for providing adjustment after assembly thereof is generally indicated by the reference numeral 106 in FIGURE 10 and parts thereof similar to the valve means 35 and 96 are indicated by like reference numerals followed by the reference letter *b*.

In particular, the valve stem 100b of the supplemental valve member 56b is so constructed and arranged that only the backing member 97b is adapted to be received in a recess 107 and be secured thereto by staking 108, the retainer 98b being received in a recess 109 having a width greater than the cross-sectional thickness of the retainer 98b and a circumference smaller than the aperture passing through the retainer 98b so that the retainer 98b can be rotated relative to the valve stem 100b even though the backing member 97b is staked thereto.

The backing member 97b and retainer 98b are respectively provided with the arcuate slots 103b and 104b whereby the passage means 105b can be adjusted to any desired size by merely rotating the retainer 98b relative to the staked backing member 97b. The retainer 98b normally is held in the selected rotational position thereof by frictionally bearing against the valve face member 102b although being adapted to be moved therefrom by merely overcoming such frictional force.

Therefore, it can be seen that the passage size 105b of the valve means 106 illustrated in FIGURE 10 can be adjusted after the same is assembled together to vary the amount of fuel flow to the main burner when the main valve means 69b is moved to its fully opened position.

Figure 11:
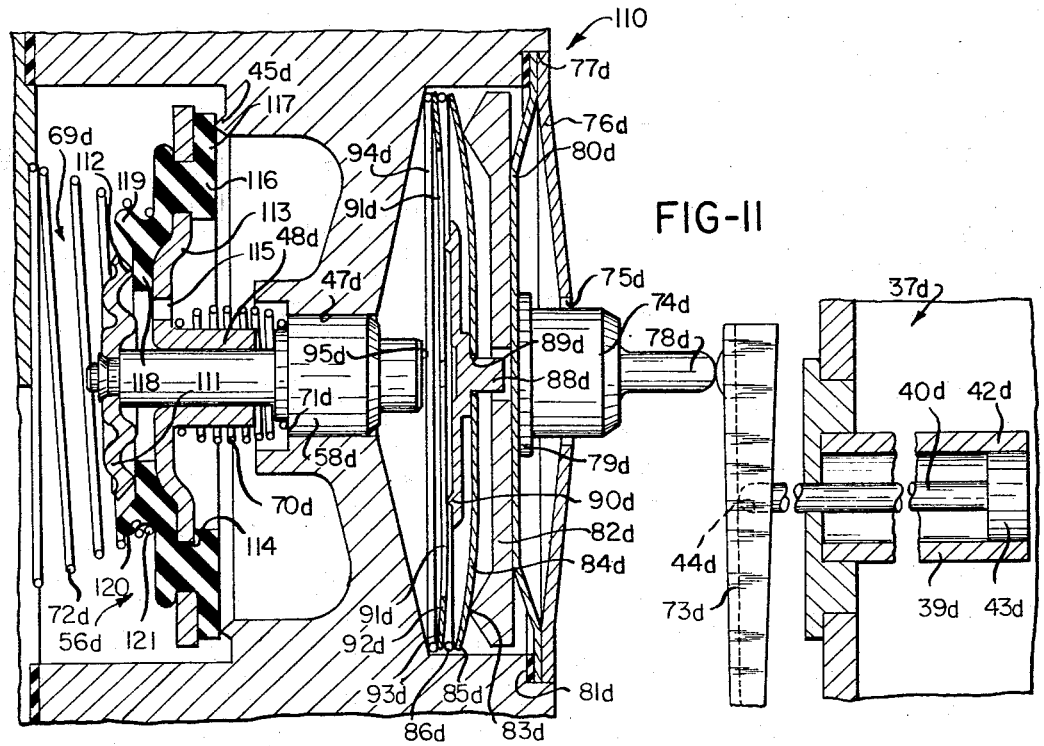
FIGURE 11 is a view similar to FIGURE 4 and illustrates another embodiment of the valve means of this invention.

Another valve means of this invention is generally indicated by the reference numeral 110 in FIGURE 11 and parts thereof similar to the valve means 35 previously described are indicated by like reference numerals followed by the reference letter d.

As illustrated in FIGURE 11, the main valve member 69d comprises a disc 111 secured to the stem 58d and is concentrically corrugated to define an annular seating structure 112.

The supplemental valve member 56b comprises a disc-like member 113 interconnected to the hollow stem portion 48d slidably and sealably receiving the stem 58d of the main valve member 69d.

Figure 12:
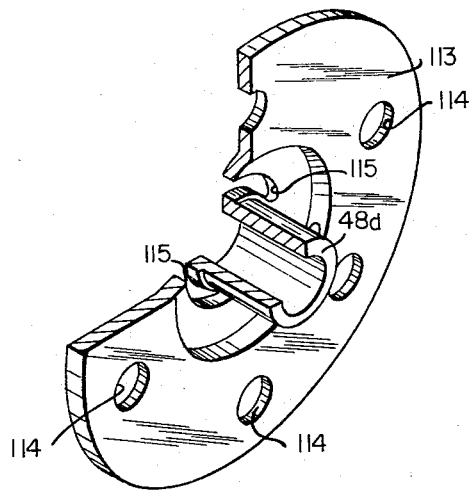
FIGURE 12 is a fragmentary perspective view of a part of the valve means of FIGURE 11.

As illustrated in FIGURE 12, the disc 113 has a plurality of circumferentially arranged openings 114 passing therethrough and disposed concentrically about a plurality of circumferentially arranged arcuate aperture means 115 passing through the disc 113 outboard of the stem 48d thereof.

A resilient means 116 is molded to the disc 113 to define an annular resilient face valve member 117 disposed on one side of the disc 113 and an annular and resilient valve seat portion 118 disposed on the other side of the disc 113, the valve seat portion 118 and valve face member 117 being integrally joined together by portions of the resilient material 116 passing through the openings 114 in the disc 113.

In this manner, the portion 117 of the resilient material 116 is adapted to seat against the supplemental valve seat 45d while the portion 118 thereof is adapted to form the main valve seat for the annular portion 112 of the main valve member 69d.

Thus, it can be seen that the resilient material 116 forms both the main valve seat and the seating structure of the supplemental valve member 56d whereby the supplemental valve member 56d can be formed in a relatively inexpensive and rapid manner to provide structure that functions in substantially the same manner as the other valve means of this invention.

The resilient material 116 of the supplemental valve member 56d is so constructed and arranged that the same defines an outwardly directed and outwardly angled annular proportion 119 which cooperates with the resilient material 116 to define an annular groove 120 outboard of the annular main valve seat 118.

In this manner, the end 121 of the compression spring 72d can be snap-fitted over the annular portion 119 of the resilient means 116 to be received in the annular groove 120 to secure the compression spring 72d to the supplemental valve member 56d.

Thus, it can be seen that the spring means 72d and 70d can be preassembled to the supplemental valve member 56d and the main valve member 59d to form a substantially integral unit which can be readily slipped into the housing 30d of the control device as desired to facilitate production operations and lower assembly costs.

Accordingly, it can be seen that improved valve means are provided by this invention which may be utilized for a plurality of purposes, one such purpose being illustrated in FIGURES 1 and 2 to control the recovery rate of a water heater tank or the like.

While the form of the invention now preferred has been disclosed as required by the statutes, other forms may be used, all coming within the scope of the claims which follow.

What is claimed is:

1. In combination, a housing having a passage means leading from an inlet to an outlet, a supplemental valve seat disposed in said passage means and interconnecting said inlet with said outlet, a supplemental valve member having a resilient surface means cooperably with said supplemental valve seat and having a main valve seat interconnecting said inlet with said outlet, said supplemental valve member having aperture means passing therethrough and surrounded by said main valve seat, said main valve seat being formed of resilient material integral with said resilient surface means of said supplemental valve member, said supplemental valve member having opening means passing therethrough with a resilient member molded to said supplemental valve member and passing through said opening means to define said resilient surface means on one side of said supplemental valve member and to define said main valve seat on the other side of said supplemental valve member, a main valve member cooperable with said main valve seat and having a stem slidably passing through said supplemental valve member, a first spring disposed between said stem and said supplemental valve member to tend to maintain said main valve member against said main valve seat, a second spring disposed between said housing and said supplemental valve member to tend to maintain said supplemental valve member against said supplemental valve seat, a snap-action member for controlling opening movement of said valve members, said snap-action member when snapped over center in one direction only opening said main valve member, said snap-action member when further moved in said one direction opening said supplemental valve member, and a resilient amplifying member disposed between said snap-action member and said stem to cause said supplemental valve member to substantially snap open even though said snap-action member had previously been snapped over center.

2. A dual valve assembly comprising a supplemental valve member having a resilient surface means on one side thereof for cooperation with a supplemental valve seat and having a resilient main valve seat on the other side thereof and being formed integrally with said resilient surface means, said supplemental valve member having opening means passing therethrough with a resilient member molded to said supplemental valve member and passing through said opening means to define said resilient surface means on one side of said supplemental valve member and to define said main valve seat on the other side of said supplemental valve member, and a main valve member carried by said supplemental valve member and being movable relative thereto, said main valve member being cooperable with said main valve seat.

3. A dual valve assembly as set forth in claim 2 wherein said supplemental valve member has a plurality of said opening means passing therethrough and receiving said molded resilient member that integrally forms said resilient main valve seat and said resilient surface means.

4. A dual valve assembly as set forth in claim 2 wherein said resilient surface means is annular and said resilient main valve seat is annular.

5. A valve member having a resilient surface means on one side thereof for cooperation with a first valve seat and having a resilient second valve seat on the other side thereof and being formed integrally with said resilient surface means, said valve member having opening means passing therethrough with a resilient member molded to said valve member and passing through said opening means to define said resilient surface means on one side of said valve member and to define said second valve seat on the other side of said valve member.

6. A valve member as set forth in claim 5 wherein said valve member has a plurality of said opening means passing therethrough and receiving said molded resilient member that integrally forms said resilient second valve seat and said resilient surface means.

References Cited by the Examiner

UNITED STATES PATENTS

| | | | |
|---|---|---|---|
| 323,568 | 8/1885 | Doherty | 137—625.3 |
| 1,878,128 | 9/1932 | Griswold. | |
| 2,650,028 | 8/1953 | Grayson | 236—48 X |
| 2,831,504 | 4/1958 | Coffey | 137—630.19 X |
| 2,884,503 | 4/1959 | Connelly | 200—670 X |
| 2,991,012 | 7/1961 | Wright. | |
| 3,052,264 | 9/1962 | Graham | 137—628 |
| 3,078,875 | 2/1963 | Farrell | 137—630.15 |
| 3,169,757 | 2/1965 | Roder et al. | 267—1 X |
| 3,190,314 | 6/1965 | Visos et al. | 137—630.15 |

FOREIGN PATENTS

| | | |
|---|---|---|
| 603,319 | 3/1960 | Italy. |
| 88,417 | 11/1956 | Norway. |

WILLIAM F. O'DEA, *Primary Examiner.*

ISADOR WEIL, *Examiner.*

J. O'NEILL, C. GORDON, *Assistant Examiners.*